United States Patent [19] [11] 4,165,885
Good et al. [45] Aug. 28, 1979

[54] TRAILER SWAY CONTROL DEVICE

[75] Inventors: Arthur L. Good, Elkhart, Ind.; Philip K. Hoopes, Jr., White Pigeon, Mich.

[73] Assignee: Masco Corporation of Indiana, Taylor, Mich.

[21] Appl. No.: 892,120

[22] Filed: Mar. 31, 1978

[51] Int. Cl.² ............................................. B60D 1/16
[52] U.S. Cl. ................................. 280/446 B; 188/129
[58] Field of Search ................... 280/446 B, 406 A; 188/67, 129; 403/122

[56] References Cited
U.S. PATENT DOCUMENTS

| 1,765,429 | 6/1930 | Kimball | 188/129 |
| 3,294,421 | 12/1966 | Mathisen | 280/446 B |
| 3,817,639 | 6/1974 | Good | 403/122 |

Primary Examiner—Joseph F. Peters, Jr.
Assistant Examiner—R. Schrecengost
Attorney, Agent, or Firm—E. Dennis O'Connor

[57] ABSTRACT

A device for controlling sway of a towed vehicle having a trailer tongue member connected to the trailer hitch member of a towing vehicle. A bar universally pivotally connected to one of the members extends through a brake assembly mounted to the other of the members for pivotal movement relative thereto about only a single axis. Within the brake assembly, the bar is contacted by friction surfaces while being permitted to move in directions parallel to the pivot axis of the assembly.

10 Claims, 7 Drawing Figures

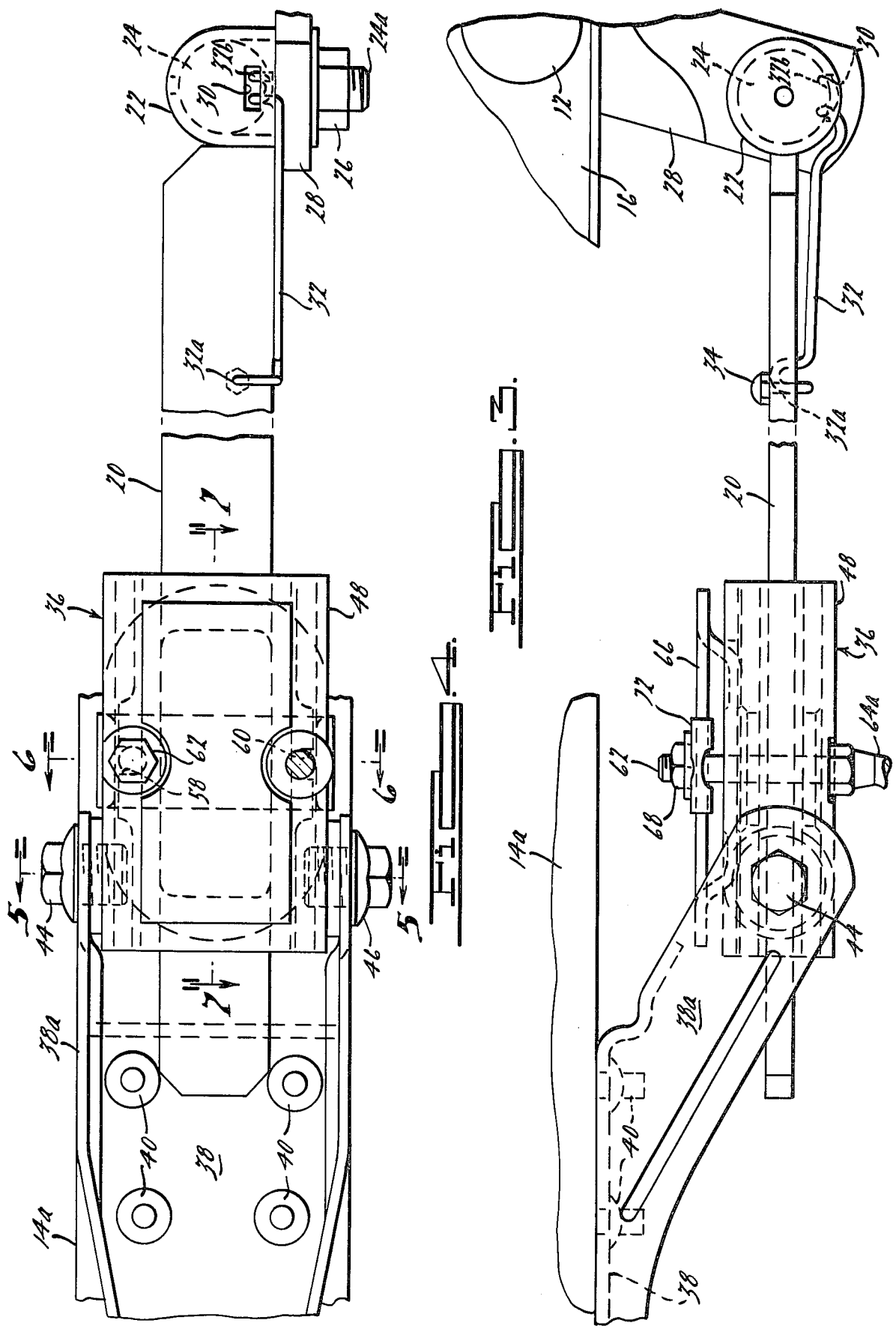

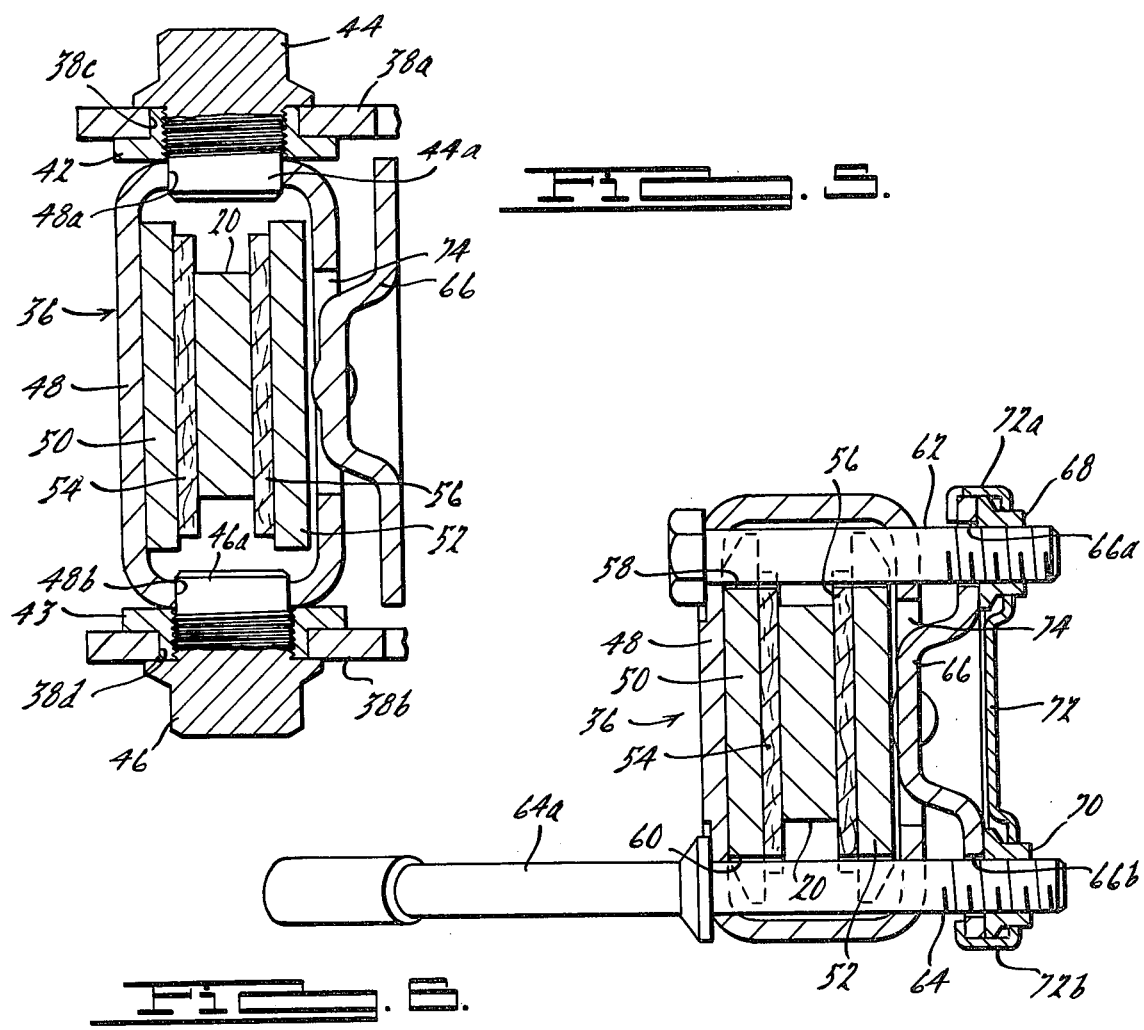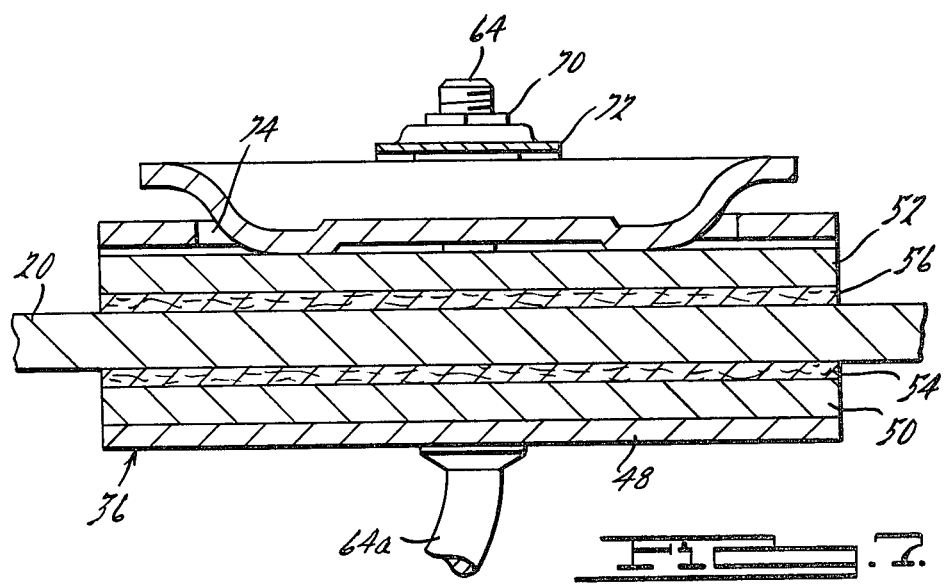

TRAILER SWAY CONTROL DEVICE

BACKGROUND OF THE INVENTION

It long has been recognized that the conventional universal joint (ball and socket) interconnection between the trailer hitch of a towing vehicle such as an automobile or light truck and the trailer tongue of a towed vehicle, of which camper and boat trailers are but two examples, permits the possibility of undesirable sway of the towed vehicle. Operation of such tandem vehicle combinations on rough, uneven or winding roads, as well as under cross-wind conditions, as well as inherent suspension characteristics, gives rise to such sway.

In order to minimize or eliminate this tendency of the towed vehicle to sway, the prior art has detailed a variety of sway control devices that provide friction forces that oppose lateral movement of the towed vehicle relative to the towing vehicle. These friction forces are overcome during operator controlled vehicle maneuvering as during turning and such lateral movement permitted. Examples of such prior art devices are disclosed by U.S. Pat. Nos. 3,552,771, issued Jan. 5, 1971, 3,542,395, issued Nov. 24, 1970 and 3,294,421, issued Dec. 27, 1966.

An object of this invention is to provide an improved friction sway control device for towed vehicles that functions in a manner superior to those previously available. A further object of this invention is to provide a friction sway control device of improved performance, but which has a simple, uncomplicated design that promotes ease and economy of manufacture and assembly to the vehicles associated therewith, as well as reliability of operation.

SUMMARY OF THE INVENTION

A device according to this invention for controlling sway between a towed vehicle having a trailer tongue member and a towing vehicle having a trailer hitch member to which the tongued member is secured includes an elongated bar. First mounting means securing the bar to one of said members while permitting universal pivotal movement therebetween. A friction brake shoe means is provided with second mounting means securing the brake shoe means to the other of said members while permitting pivotal movement therebetween about only a single axis. The brake shoe means engages the bar end with at least one friction surface frictionally contacting the bar. The friction surface is planar and lies parallel to the pivot axis. The brake shoe means is constructed to permit substantial relative movement between the bar and the friction surface in a direction parallel to the pivot axis as well as in a direction normal to this axis.

DESCRIPTION OF THE DRAWINGS

FIG. 3 is a top view with parts broken away and hidden lines shown in phantom, of the trailer sway device of FIG. 2;

FIG. 4 is a side elevation view, with parts broken away and hidden lines represented in phantom, of the device of FIG. 2;

FIG. 5 is a section view taken along the line 5—5 of FIG. 4;

FIG. 6 is a section view taken along the line 6—6 of FIG. 4; and

FIG. 7 is a section view taken along the line 7—7 of FIG. 4.

DETAILED DESCRIPTION OF THE INVENTION

Figure 1:
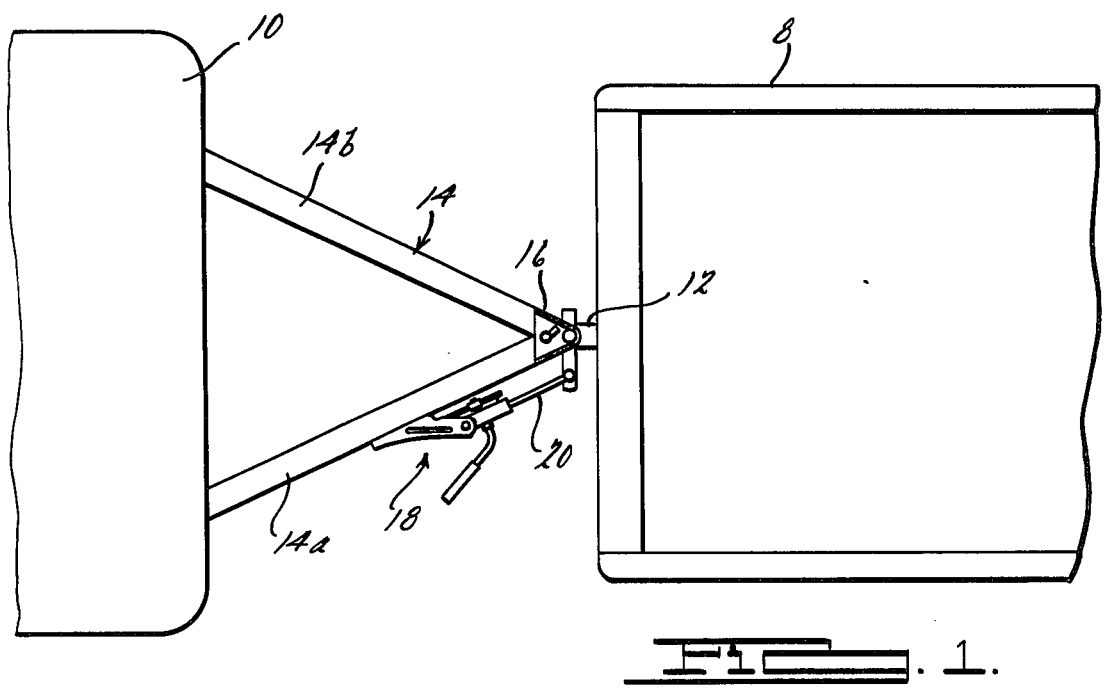
FIG. 1 is a schematic top view representing a towing and towed vehicle tandem with the trailer sway control device of this invention associated therewith.

Referring now in detail to the drawings, and in particular to FIG. 1 thereof, the numeral 8 denotes generally a towing vehicle secured to and towing a towed vehicle 10. The interconnection between the towing vehicle 8 and towed vehicle 10 is by means of a trailer hitch 12 secured to the towing vehicle and a trailer tongue 14 secured to the towed vehicle. While the trailer sway control device of this invention may be utilized with trailer tongue constructions of various types, a so-called "A-frame" trailer tongue is shown in FIG. 1 for illustrative purposes and includes a pair of relatively angularly positioned structural members 14a and 14b that converge proximate the trailer hitch 12. Secured to trailer tongue 14 at the convergence of members 14a and 14b is a coupler 16 as is well known in the art. Coupler 16 comprises a female member having an arcuate configuration that receives a male member or ball that is part of trailer hitch 12. Such a hitching relationship is well known in the art to provide a universal pivotal coupling between the towing and towed vehicle.

The trailer sway control device of this invention is designated generally by the reference numeral 18. It is shown in a position lying generally parallel to trailer tongue element 14a, although as readily may be appreciated by one having skill in the art, the device 18 may be positioned along either trailer tongue element, or along a single element trailer tongue.

Device 18 includes a friction bar 20 having a rectangular cross section with a female socket member 22 secured as by welding to one end thereof. Socket member 22 is open-ended with a partial spherical internal configuration in order to receive a partially spherical ball member 24. Member 24 includes a threaded shank portion 24a that extends through an aperture in an adapter bar 28 and is secured to the adapter bar by nut 26. Adapter bar 28, at its end remote from member 24, is fixedly secured to the trailer hitch 12 as by welding or other suitable means.

To facilitate a removable interconnection between socket member 22 and ball member 24, a slot 30 is formed through socket member 22 at a position between the open end of the socket member and the center of the spherical portion of the ball when the ball member 24 fully is received in socket member 22. A retaining spring clip 32 has one end 32a thereof which extends through an aperture in bar 20 and is secured in this position by a jam nut 34 or any other suitable fastening means. The end of spring clip 32 remote from end 32a extends within the socket member 22 and has a U-shaped projection proximate the end portion thereof.

When this portion of spring clip 32 is aligned within socket member 22 with slot 30, the resilient force of the spring material from which the spring clip is formed causes projection 32b to extend into and be held in slot 30, thereby locking socket member 22 onto ball member 24. When it is desired to separate ball member 24 and socket member 22, spring clip end 32b, which is accessible from the exterior of the socket member via slot 30, need only be depressed manually out of slot 30 while socket member 22 is lifted from ball member 24.

It thus may be seen that by means of the ball and socket connection provided by socket member 22 and ball member 24, as well as the rigid interconnection of the ball member to the trailer hitch 12 by adapter bar 28, friction bar 20 effectively may be universally pivotally connected to the trailer hitch 12 of vehicle 8.

Figure 2:
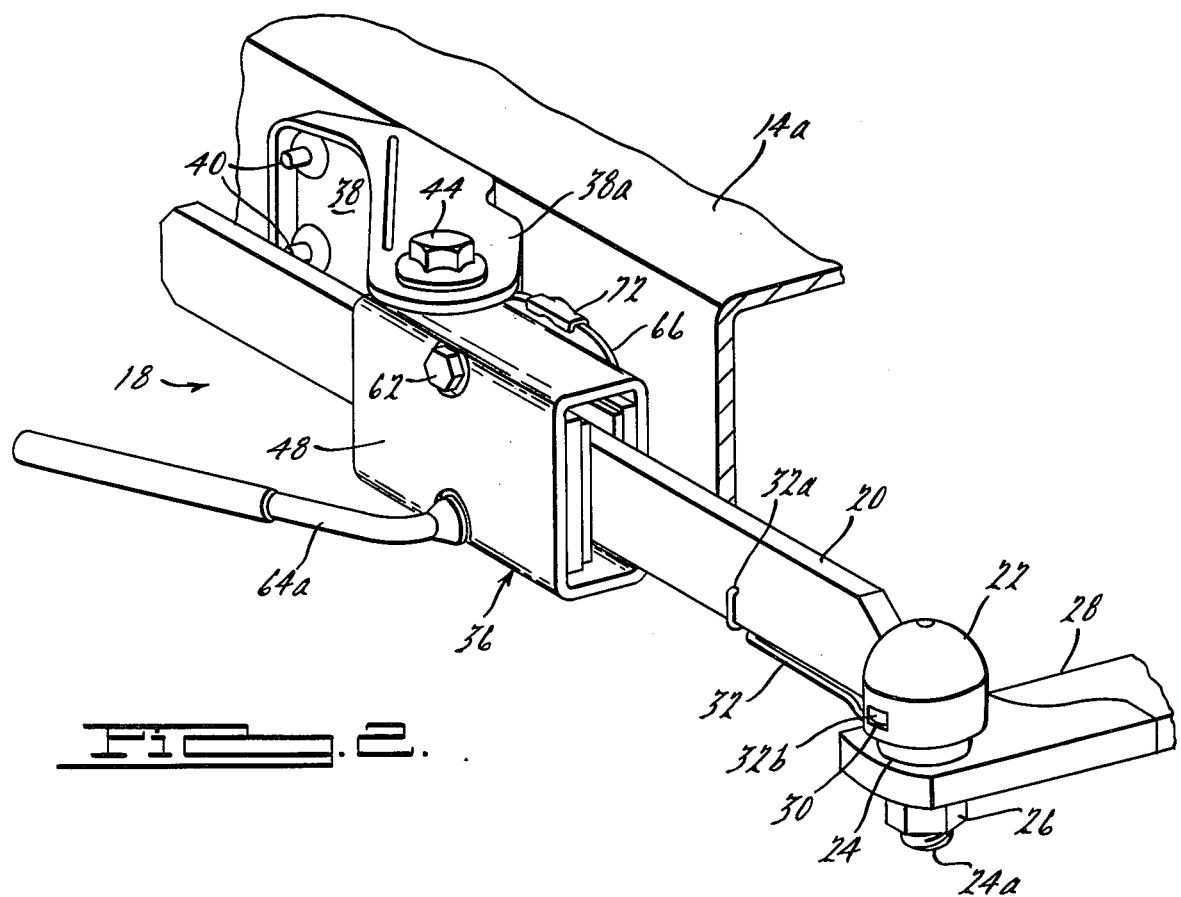
FIG. 2 is an isometric view of the trailer sway control device of FIG. 1, and including portions of the towing vehicle trailer hitch and towed vehicle trailer tongue.

As best may be seen in FIGS. 2, 3 and 4, the trailer sway control device 18 includes a brake assembly designated generally by the reference numeral 36. The mounting of brake assembly 36 is accomplished by means of a bracket 38 secured to trailer tongue member 14a by fasteners 40. Bracket 38 includes a pair of spaced apart arms 38a and 38b that extend angularly from trailer tongue 14a. Each of bracket arms 38a and 38b has formed therethrough holes 38c and 38d, respectively, which holes 38c and 38d are aligned. Internally threaded bushings 42 and 43 are positioned in holes 38c and 38d, respectively. Pivot nuts 44 and 46 are threaded through and extend beyond bushings 42 and 43 respectively.

The purpose of pivot nuts 44 and 46 is to provide single axis pivot means to which brake assembly 36 is attached. Brake assembly 36 includes an outer housing 48 in the form of a rectangular tube having aligned apertures 48a and 48b extending therethrough in the opposed short dimension sides thereof. Pivot nut shanks 44a and 46a, which are not threaded at their extremities, extend into and through apertures 48a and 48b, respectively, of brake assembly housing 48. It thus may be seen that by means of bracket 38 and the pivot assembly described herebefore, brake assembly 36 operatively is pivotally connected to the towed vehicle trailer tongue 14 in a manner permitting pivotal movement by the brake assembly about only a single axis, which axis extends through the centers of pivot nuts 44 and 46.

With reference to FIGS. 5 and 6 of the drawings and the details of brake assembly 36, it may be seen that positioned within the brake assembly housing 48 are a pair of brake shoes 50 and 52, having opposed surfaces 54 and 56, respectively, of friction material formed thereon. The friction material surfaces are planar, lie parallel to the pivot axis of the brake assembly and contact opposite long dimension sides of friction bar 20 that extends through the brake assembly. As best seen in FIGS. 4 and 6, brake shoe 50 has an upper slot 58 and a lower slot 60 formed therein at its opposite vertical extremities. Brake shoe 52 has identical slots formed therein (unnumbered) each of which are aligned with one of slots 58 and 60. A bolt 62, threaded along a portion of its shank, extend through the upper slots of brake shoes 50 and 52 as well as through aligned apertures (unnumbered) in the long dimension sides of housing 48. A similar bolt 64 extends through the lower brake shoe slots and housing 48. The head end of bolt 64 is formed with a handle projection 64a that extends to the exterior of brake assembly 36. The function and purpose of handle projections 64a will be explained in detail below.

A resilient spring member 66 is positioned between housing 48 and trailer tongue element 14a and includes a C-shaped portion that extends through an opening 74 in a long dimension side of housing 48 so that the C-shaped spring portion bears upon the side of brake shoe 52 remote from friction material 56. Bolts 62 and 64 extend through openings 66a and 66b, respectively, formed in spring 66 and are engaged by nuts 68 and 70, respectively. A spring clip 72, formed from a sheet of rigid material, surrounds nuts 68 and 70 and has end portions 72a and 72b engaging opposite ends of spring 66 so that spring clip 72 is locked against movement relative to the spring 66, and therefore locks nuts 68 and 70 against rotation relative to bolts 62 and 64 respectively.

As may be seen from the above description of the details of construction of brake assembly 36, it readily may be appreciated that bolt 62 and nut 68 may be engaged to predetermined relative positions to bring friction material surfaces 54 and 56 into engagement with friction bar 20. Thereafter, by manual manipulation of handle projection 64a of bolt 64, the frictional forces between bar 20 and friction surfaces 54 and 56 may be increased or decreased by tightening or loosening nut 70 upon bolt 64. As will be explained in detail below, the magnitude of the frictional forces between the bar 20 and the friction elements of the brake assembly 36 determines the magnitude of the deterrent to sway provided by the trailer sway control device of this invention.

The function of the trailer sway control device described in detail above is as follows. As is well known, the conventional universal pivotal attachment between towed and towing vehicles such as is illustrated in FIG. 1, allows relative transverse motion between the two vehicles. Such motion is necessary, of course, during maneuvering of the tandem vehicle arrangement, such as turning. However, sway or transverse movement of the towed vehicle 10 relative to the towing vehicle 8 during straight line highway operation is undesirable. It readily may be appreciated that when such relative transverse movement occurs, there is an angular rotation of trailer tongue 14 about a vertical axis extending through the trailer hitch of the towing vehicle. Because friction bar 20 operatively is secured to the towing vehicle and brake assembly 36 operatively is secured to the trailer tongue 14 of the towed vehicle, this relative angular movement will cause relative movement of the brake assembly 36 along the length of the friction bar 20. The friction forces generated between the friction bar and the friction surfaces of the brake assembly 36 thus tend to resist the transverse or lateral movement (sway) of the towed vehicle. The degree of resistance to such transverse movement may be adjusted for particular road conditions and/or vehicle characteristics by varying the friction forces between bar 20 and friction surfaces 54 and 56. This adjustment infrictional forces and hence the magnitude of sway control is accomplished by manual manipulation of handle 64a as described above.

All of the functions heretofore described for the sway control device of this invention are well known in the art for friction sway control devices of this type, for example, the device disclosed in U.S. Pat. No. 3,294,421 described above.

Because of the transverse relative movement between towed and towing vehicle which is desirable during maneuvering, as well as other relative movements between the two vehicles, such as relative vertical movements and relative twisting movements as may be encountered on uneven, undulating roads, it is necessary to provide for relative movement between the friction bar 20 and brake assembly 36 in addition to the longitudinal relative movement along the axis of the friction bar 20. Prior art sway control devices of the friction member-brake type either have not accommodated such relative movement to a sufficient extent, or in the case of previously mentioned U.S. Pat. No. 3,294,421, have accommodated such relative movement by universal mounting of both the friction member (bar 20 in this invention) and the brake shoe member (assembly 36 of this invention).

In contradistinction and as part of this invention, it was determined that only "two degree" freedom of movement was required between the sway control device element (friction (friction member or brake assembly) mounted to the towed vehicle to accommodate the relative movements between the two tandem vehicles. It was this determination that allows the unique mounting of brake assembly 36 as illustrated herein, wherein the brake assembly is pivotally secured to the trailer tongue element 14a about only a single pivot axis, the axis that extends through the centers of pivot nuts 44 and 46. As illustrated, this mounting of brake assembly 36 allows horizontal rotation of the brake assembly about only a vertical pivot axis. However, as readily may be appreciated, this pivot axis could be oriented at any angular orientation to the vertical so long as pivotal movement about a single axis is provided. This permitted pivotal movement provides one degree of freedom of motion necessary to acommodate relative vehicular movement.

The second degree of freedom of movement is provided by the unique dimensioning of the brake assembly 36 relative to the cross sectional size of friction bar 20. As is best illustrated in FIGS. 5 and 6 of the drawings, substantial clearance is provided above and below the short dimension sides of the rectangular cross sectionaled area friction bar 20. This allows the friction bar, which can pivot universally about ball member 24, to move relative to brake assembly 36 in a direction parallel to the pivot axis of the brake assembly (up and down as illustrated).

Two degree freedom of movement thus is provided without the need for universal pivotal mounting of both the brake assembly and friction member and the respective vehicles to which they are mounted.

Certain advantages are provided by the sway control device mounting scheme of this invention. This scheme provides for a more rigid and reliable coupling of the various parts to one another. Furthermore, since the relative movement permitted between the brake assembly and the trailer tongue assembly to which it is mounted is pivotal movement about only a single axis, and this axis passes substantially through the center of the friction bar 20, any tendency for torsional or twisting movement between the friction bar and the brake assembly is minimized. Additionally, since the pivot axis of the brake assembly 36 extends through friction bar 20 and the propensity for a torsional twisting on the friction bar is reduced by this arrangement, it is possible to construct the friction bar 20 of less massive dimensions with an attendant savings in material and weight.

Still another advantage to the single pivot axis mounting of brake assembly 36 is realized when towed vehicle 10 is uncoupled from towing vehicle 8 as during temporary parking or storage. The single pivot axis mount does not permit the free end of friction bar 20, which has been uncoupled from ball member 24, to deflect angularly towards or away from the ground since brake assembly 36 can pivot only about the single axis and the friction material surfaces in the brake assembly hold bar 20 against movement relative to the brake assembly. While upon first impression this may seem to be a minor feature, when a towed vehicle such as a boat trailer manually is maneuvered as when it is positioned in a storage area or garage, it is important that obstacles along the ground or depressions in the supporting surface not be engaged by any structure that is part of the trailer. Since such trailers often are difficult to maneuver manually and require full strength, two handed movement by the person maneuvering the trailer, a trailing friction member dragging along the ground could present a serious impediment to such manual maneuvering.

It thus may be seen that this invention provides an improved friction sway control device for towed vehicles that functions in a manner believed superior to those previously available. Furthermore, this invention provides a friction sway control device which has an uncomplicated design that is simple and economical to manufacture and assemble and is reliable in operation.

We claim:

1. Apparatus for controlling sway between a towed vehicle having a trailer tongue member and a towing vehicle having a trailer hitch member to which said tongue member is secured, a bar having at least one planar bar surface, first mounting means securing said bar to one of said members while permitting universal pivotal movement of said bar relative to said one member about said first mounting means, friction brake means, and second mounting means securing said brake means to the other of said members while permitting pivotal movement therebetween about only a single axis, said brake means engaging said bar and having at least one friction surface frictionally contacting said planar bar surface, said friction surface being planar and parallel to both said axis and said planar bar surface, said brake means and said second mounting means being spaced from said bar a distance sufficient to permit substantial swinging movement of said bar about said first mounting means and parallel to said axis, the dimension of said friction surface measured along a line parallel to said axis being substantially greater than the corresponding dimension of said planar bar surface such that upon said substantial swinging movement of said bar about said first mounting means in directions parallel to said axis said friction surface and said planar bar surface remain in friction contact.

2. The apparatus of claim 1, wherein said axis passes through said bar.

3. The apparatus of claim 2, wherein said brake means includes a pair of planar friction surfaces, each of said surfaces being planar, in contact with one of said planar bar surfaces and parallel to said axis.

4. The apparatus of claim 2, wherein said one of said members is said trailer hitch member and said other member is the trailer tongue member and wherein said axis is substantially vertical.

5. Apparatus according to claim 1, wherein said first mounting means comprises a male ball element having a partially spherical outer profile secured to said one of said members and an open ended female cup element secured to said bar and receiving said ball element, said cup element having a slot formed therethrough positioned between the open end of said cup element and the center of said spherical outer profile of said ball element when said ball element is received in said cup element, and a resiliently deformable retaining element secured to said bar and capable of being resiliently deformed so that a portion of said retaining element is removably received in said slot to prevent removal of said ball element from said cup element.

6. Apparatus according to claim 5, in which said retaining element is formed from resiliently deformable wire.

7. Apparatus according to claim 1, in which said second mounting means comprises a bracket secured to said other of said members and having a pair of spaced apart arms extending therefrom, said brake means being positioned between said arms and attached to each of said arms by one of a pair of axially aligned pivot elements, said axis extending between said pivot elements and concentric with the pivot axes thereof.

8. Apparatus for controlling sway between a towed vehicle having a trailer tongue member and a towing vehicle having a trailer hitch member to which said tongue member is secured, an elongate bar having a pair of flat parallel sides, universal pivot means securing said bar to one of said members and permitting universal pivotal movement of said bar relative to said one member about said pivot means, friction brake means, mounting means securing said brake means to the other of said members while permitting pivotal movement therebetween about only a single axis parallel to said sides, said brake means including outer housing means having an open passage extending therethrough and planar friction shoe surfaces within said housing and partially defining said passage, said bar extending through said passage and being capable of reciprocal movement therein normal to said axis and substantial swinging movement therein parallel to said axis and about said pivot means, at least one of said shoe surfaces frictionally engaging at least one of said sides, the dimension of said shoe surfaces measured along a line parallel to said axis being substantially greater than the width of said sides measured along a line parallel to said axis for allowing continuous frictional engagement between at least one of said shoe surfaces and one of said sides during said substantial swinging movement of said bar.

9. The apparatus of claim 8, wherein said axis passes through said bar.

10. The apparatus of claim 9, wherein said one of said members is said trailer hitch member and said other of said members is said trailer tongue member.

* * * * *